Sept. 6, 1960  R. F. VANDAVEER  2,951,747
GRID DESIGN FOR FLUID BED REACTOR
Filed Dec. 23, 1957  2 Sheets-Sheet 1

INVENTOR.
ROSCOE F. VANDAVEER
BY Arthur Mc Ilroy
ATTORNEY

Sept. 6, 1960 R. F. VANDAVEER 2,951,747
GRID DESIGN FOR FLUID BED REACTOR
Filed Dec. 23, 1957 2 Sheets-Sheet 2

INVENTOR.
ROSCOE F. VANDAVEER
BY
ATTORNEY

United States Patent Office 2,951,747
Patented Sept. 6, 1960

2,951,747

GRID DESIGN FOR FLUID BED REACTOR

Roscoe F. Vandaveer, Tulsa, Okla., assignor to Pan American Petroleum Corporation, Tulsa, Okla., a corporation of Delaware Filed Dec. 23, 1957, Ser. No. 704,789

2 Claims. (Cl. 23—284)

The present invention relates to a novel grid design for vessels used in handling fluidized beds. More particularly it is concerned with an improved grid design capable of promoting better gas-solids contacting during fluidized operation.

Broadly stated, my invention comprises a grid including a structurally stable porous sub-section over which one or more layers of a tough flexible porous covering are superimposed. The sub-section may or may not rest on a suitable structural support—this generally depending on the diameter of the grid contemplated.

Figure 1:
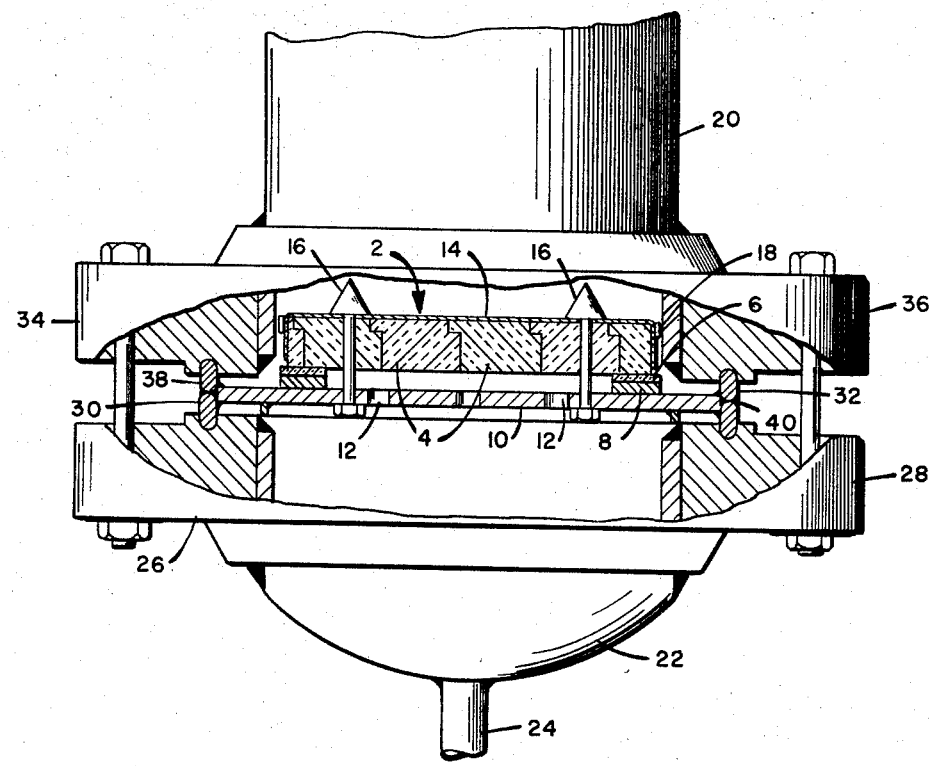
Figure 1 is a fragmentary elevational view, partly in section, showing the assembly of my novel grid design in the base of a typical fluid reactor unit.
Figure 2:
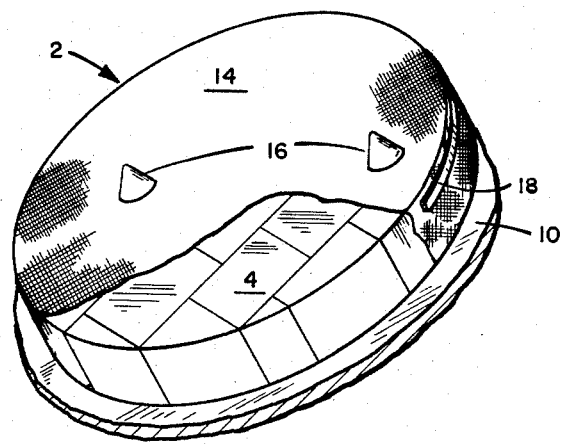
Figure 2 is a plan view of the grid shown in Figure 1 with a portion of the grid cover removed.

In fluidized operations such as, for example, in the manufacture of hydrocarbons by the reduction of carbon monoxide with hydrogen in the presence of a dense fluidized bed of iron catalyst, a portion of the catalyst has been observed to accumulate on the grid and eventually plug a substantial number of the grid holes. Excessive catalyst deposition occurs in areas of the grid primarily where there is little gas flow, i.e., "dead spots." To avoid this, the gas injection system should be so designed as to produce no stagnant regions of catalyst above the inlet and within the fluidization zone. Conventional fluid units containing grids or other obstructions to gas flow and/or which employ a wide cone angle do not meet these requirements, since catalyst may settle out on the flat upper surfaces of the grid or on the walls of the cone bottom. Catalyst pile-up has been found to be particularly objectionable in exothermic reactions such as hydrocarbon synthesis because accumulation of catalyst not only resulted in inefficient contacting of reactant gases with solids, but also poor heat exchange, consequently causing hot spots in the unfluidized catalyst and ultimately requiring a shutdown of operation. Accumulation of such deposits not only produced serious gas pressure drop but also resulted in deflected gas streams causing erosion of cooling tubes and reactor walls.

Also in many fluidized systems, plugging of the grid holes is frequently encountered when an appreciable pressure drop occurs in the system or when fluidization is terminated. The defluidized catalyst tends to plug some of the grid holes and pack between them. Generally, under such circumstances, it is extremely difficult to refluidize all of the bed, particularly where the catalyst is quite dense and packs readily. When refluidization is attempted, the flow of gas through the grid is unbalanced, resulting in only partial fluidization, causing both inefficient gas-solids contacting and local over heating in the bed of packed catalyst resting on the reactor grid.

To overcome these problems a number of solutions have been offered. One such proposal involved the use of glass wool or similar material in the form of relatively thick layers or batts, i.e. 10 to 12 inches thick, overlaid with a layer of glass cloth. Initially this type of structure functions quite smoothly. However, if the bed of catalyst is allowed to become defluidized for any reason, the weight of the bed tends to deform and pack the glass wool, resulting ultimately in unbalanced gas flow through the distributor and faulty operation. Moreover, filters of this type are awkward to construct and cumbersome to handle.

Ceramic or plates constructed of similar materials have been used for gas distribution systems in operations such as hydrocarbon synthesis. However, it has been found, as may be seen by the photographs shown herein, that grids made from these materials surprisingly accumulate large quantities of catalyst, carbon and wax, in cementitious-like layers over the surface of the porous plate. This result is considered indeed unexpected, since the distribution of gas through a porous plate is substantially perfect and leaves no "dead spots" on the grid surface on which catalyst or other materials could be expected to collect. The formation of these layers causes an increase in pressure drop across the grid and eventually a shut-down of the reactor. Porous plates after such treatment are difficult, if not impossible, to recondition for subsequent use and generally must be replaced with new plates.

Accordingly it is an object of my invention to provide a porous grid structure suitable for use in fluidized systems, capable of affording uniform gas distribution in the reaction zone, while at the same time preventing the deposition of harmful quantities of finely divided solids in the pores of the grid. It is also an object of my invention to protect the grid from harmful deposits of catalyst and/or high boiling or other solid residual materials by placing over the grid a tough porous flexible covering which, under the conditions of use, distends and contracts to a sufficient degree so that the deposit or layer laid down on the covering is continuously broken up and removed.

In Figure 1 of the drawings a grid 2, composed of a plurality of individual and snugly fitting blocks 4, rests upon a thin asbestos gasket 6, which in turn is seated on a flat sealing ring 8. This assembly of the porous grid gasket and sealing ring is supported by means of plate 10 having perforations 12 through which feed gas passes. Over the top of porous grid 2 is a single layer of heavy silicon impregnated glass cloth 14, secured snugly to the grid by means of cone bolts 16 and metal strap or rim 18. The grid, as thus far described, rests at the base of fluid reactor 20, having a bowl-like bottom portion 22, equipped with gas inlet 24 and flanges 26 and 28. Seated in flanges 26 and 28 is ring type joint carbon steel gasket 30, held tightly against a second such gasket 32, in turn held in place by means of flanges 34 and 36. A gas tight seal between the aforesaid ring type gaskets and plate 10 is effected by welding the gaskets to plate 10, as shown at 38 and 40.

The porous plates used in my novel grid design may be fabricated out of a number of porous structurally stable materials such as, for example, fused particles of kaolin, silicate or various grades of alumina refractories (Alundum). Size of the particles to be fused will depend on the gas rate and the pressure drop which can be tolerated across the grid. These plates may also be constructed of porous glass foam, pumice, porous metal discs, etc. While glass cloth is preferred for use in carrying out processes involving high temperatures, other flexible, porous material such as coarse canvas, or other treated porous cloth may be substituted for glass cloth where low to moderate reaction temperatures are employed.

Figure 3:
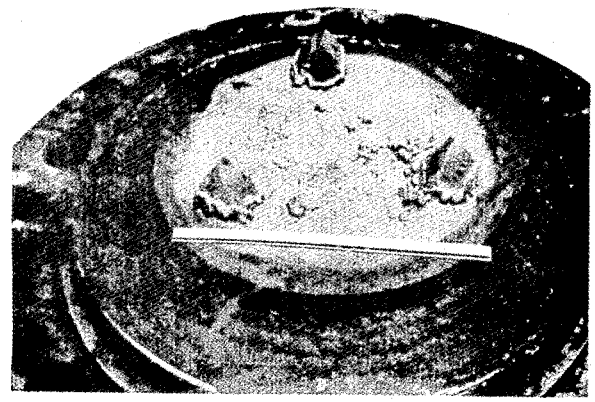
Figure 3 is a photograph of a porous grid and supporting assembly, after use in a typical hydrocarbon synthesis run using a fluidized catalyst bed.

Figure 3 is a photograph of the bottom section of a hydrocarbon synthesis reactor, 20 feet long and 8 inches I.D. The grid, in this instance, consisted of a porous Alundum plate (center) held in place by three cone bolts. The hydrocarbon synthesis process carried out employed an alkali promoted iron mill scale catalyst under well known synthesis conditions. This photograph was taken after approximately 400 hours of use. Inspection of the grid plate showed it to have a deposit of catalyst ⅛ to ¼ inch in thickness. Also there were agglomerates of catalyst ¼ to ½ inch in diameter scattered over the plate. Surfaces of the cone bolt heads were covered with irregular folds of a similar deposit. Approximate thickness of this deposit was about ⅛ inch. Erosion was apparent. Around the edge of the grid can be seen a dark border of irregular width. In this particular area it was observed that the catalyst, carbon, and waxy residue had cemented itself to the porous plate thereby plugging the pores thereof. Evidence indicated that with time this border would widen until the entire plate became covered with such a cementitious layer.

Figure 4:
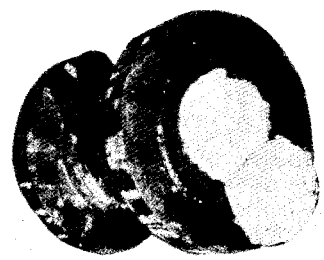
Figure 4 is a photograph showing the condition of a glass wool grid having a glass cloth cover, after use in typical hydrocarbon synthesis fluid bed operations.
Figure 5:
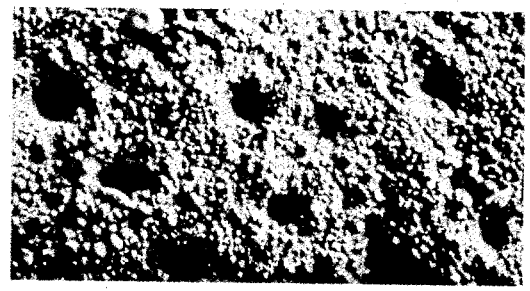
Figure 5 is a photograph showing in detail (magnified twenty times) the condition of the porous plate of Figure 3, after use in hydrocarbon synthesis operations.

Figure 4 is another photograph of the same portion of the reactor shown in Figure 3. However, a 12 inch layer of glass wool was employed in place of the Alundum plate. Over this section of glass wool was placed a single thin layer of silicon impregnated glass cloth. This photograph was taken after about 250 hours of conventional hydrocarbon synthesis operation. The glass cloth was partially cut away, as shown, indicating that even after a 250 hour period of operation, no penetration of catalyst or other objectionable material into the glass wool gas distribution section had occurred. In fact no deposits of any kind were found on the surface of the glass cloth exposed to the reaction zone; actually the condition of the cloth appeared no different after than before use. One of the distinct advantages of a grid designed in accordance with my invention resides in the ease with which it may be serviced. Thus, if the original cloth has to be removed for any reason, a new covering may be readily inserted in its place and operations resumed with minimum delay.

Fluid bed reactors equipped with my novel grid design may be used in conducting any fluidized process, particularly where improved gas-solids contacting is desired. Inasmuch as the conditions for employing the fluidized technique are now generally well known for a wide variety of processes, it is not considered necessary to go into detail regarding such methods of operation. My invention can be used either in systems in which the fluidized bed is composed of finely divided catalyst capable of promoting a reaction involving one or more vaporous components; or it can be employed in processes in which the particles making up the fluid bed are acted upon either in the presence or in the absence of a solid fluidized catalyst. Examples of the first class of processes are hydrocarbon synthesis, catalytic cracking, etc. The second class of reactions contemplated includes the fluidized reduction of metal oxides such as iron oxide to the free metal, or the roasting of metal sulfides, for example, copper sulfide, to its corresponding oxide prior to electrolytic reduction of the latter to free copper. A further variation of the above processes in which the grid design of my invention is likewise applicable is exemplified in the manufacture of silicones by the fluid bed technique. In this process powdered silicon is fluidized along with finely divided copper catalyst. Methyl chloride or an equivalent alkyl halide is used as the fluidizing gas and reacts with the silicon to form the corresponding alkyl silane. Examples of still other fluidized processes in which a grid of my design may be advantageously employed are catalytic dehydrogenation processes, reforming, isomerization, alkalization with solid catalyst, and the oxidation or chlorination of hydrocarbons.

In the present description and claims, the expression "porous plate" is intended to cover a single, continuous layer of a suitable porous material or a plurality of closely fitting blocks constructed thereof in forming the grid of my invention.

I claim:

1. Apparatus comprising in combination a reaction vessel adapted to contain a bed of fluidized solids in a gaseous medium, in the lower portion of said vessel a grid comprising a structurally stable porous plate, a tough flexible porous fibrous covering secured over the top of said plate, means securing a perforated plate below said porous plate in gas-tight relation to the walls of said vessel, means to attach said porous plate to said perforated plate and an annular support surrounding the underneath outer side of said porous plate forming a gas-tight seal therewith and resting on said perforated plate to define a hollow space between said porous plate and said perforated plate, said hollow space being of smaller diameter than the diameter of said porous plate.

2. Apparatus for conducting hydrocarbon synthesis comprising in combination a reaction vessel adapted to contain a bed of fluidized solids, in the lower portion of said vessel a grid comprising a structurally stable porous plate, a tough flexible porous covering secured over the top of said plate, means securing a perforated plate below said porous plate in gas-tight relation to the walls of said vessel, means for holding said perforated plate to said porous plate and an annular support surrounding the underneath outer side of said porous plate forming a gas-tight seal therewith and resting on said perforated plate to define a hollow space between said porous plate and said perforated plate, said hollow space being of smaller diameter than the diameter of said porous plate.

References Cited in the file of this patent

UNITED STATES PATENTS

| Number | Name | Date |
| --- | --- | --- |
| 1,759,983 | Houston | May 27, 1930 |
| 2,513,369 | Shaw | July 4, 1950 |
| 2,527,455 | Schemm | Oct. 24, 1950 |
| 2,527,488 | Schemm | Oct. 24, 1950 |
| 2,833,595 | Standish | May 6, 1958 |